(12) United States Patent
Oliver et al.

(10) Patent No.: US 6,674,371 B1
(45) Date of Patent: Jan. 6, 2004

(54) UTILITY METER REMOTE READER

(75) Inventors: Stewart Oliver, Venice, CA (US); Michael Middleton, Franklin, MA (US)

(73) Assignee: Hersey Meter Company, Cleveland, NC (US)

( * ) Notice: Subject to any disclaimer, the term of this patent is extended or adjusted under 35 U.S.C. 154(b) by 352 days.

(21) Appl. No.: 09/640,864

(22) Filed: Aug. 18, 2000

(51) Int. Cl.$^7$ .............................................. G08B 23/00
(52) U.S. Cl. ........................... 340/870.02; 340/820.37; 341/15; 341/173
(58) Field of Search ....................... 340/870.02, 870.03, 340/870.37; 341/15, 16, 192, 173; 250/231.13

(56) References Cited

U.S. PATENT DOCUMENTS

| | | | | |
|---|---|---|---|---|
| 3,806,650 A | * | 4/1974 | Krone et al. ............ | 379/106.01 |
| 3,840,866 A | * | 10/1974 | St. Clair et al. ........ | 340/870.02 |
| 4,037,219 A | * | 7/1977 | Lewis .................... | 340/870.22 |
| 4,137,451 A | * | 1/1979 | Einolf, Jr. ............. | 250/231.13 |
| 4,350,980 A | * | 9/1982 | Ward .................... | 340/870.02 |
| 4,439,764 A | * | 3/1984 | York et al. ............. | 340/870.02 |
| 4,652,877 A | | 3/1987 | Gray | |
| 4,728,950 A | * | 3/1988 | Hendrickson et al. . | 340/870.31 |
| 4,779,094 A | * | 10/1988 | Lee et al. .............. | 340/870.37 |
| 4,782,341 A | * | 11/1988 | Gray ..................... | 340/870.02 |
| 5,045,776 A | * | 9/1991 | Claridge ................ | 340/870.02 |
| 5,565,861 A | * | 10/1996 | Mettler et al. ......... | 340/870.02 |
| 5,572,200 A | * | 11/1996 | Mettler ................. | 340/870.02 |
| 5,796,250 A | * | 8/1998 | Dames .................. | 324/207.22 |
| 6,087,957 A | * | 7/2000 | Gray ........................ | 340/10.1 |
| 6,124,806 A | * | 9/2000 | Cunningham et al. . | 340/870.02 |

* cited by examiner

*Primary Examiner*—Michael Horabik
*Assistant Examiner*—Albert K. Wong
(74) *Attorney, Agent, or Firm*—Troutman Sanders LLP; Gerald R. Boss

(57) ABSTRACT

A utility meter reading device includes a set of stator wheels each including a plurality of conductive segments and a set of indexable digit discs driven sequentially by consumption of a provided utility and having each a conductive segment movable upon rotation of a respective disc into capacitive alignment with one of the conductive segments of a stator wheel; a micro-controller supplies a current signal to the meter discs and stators and through a circuit reads the amount of the utility consumed as reflected in the alignment of certain ones of the conductive segments of the discs and stator wheels.

13 Claims, 6 Drawing Sheets

UTILITY METER REMOTE READER

FIELD OF THE INVENTION

The present invention relates to utility meter reading devices that can be accessed from a remote location in order to reduce the time and labor required to accurately record data from a customer's meter.

BACKGROUND OF THE INVENTION

In the distribution of such utilities as water, gas or electricity, mechanical meters have been employed to measure consumption of the utility at or near the customer's site. To reduce the costs associated with reading such meters, efforts have been directed to modification or replacement of such meters with equipment that will allow remote access to the mechanical meter register in such a way that a determination of the amount of the utility that has been consumed can be made. While the replacement meters have proven useful, their expense has been a limitations on their implementation by utility suppliers particularly where the older mechanical meters continue to function correctly.

Incorporation of electronic reader devices into mechanical dial or disk meters has been attempted with some success but, again, care must be taken to avoid upsetting the register operation so as not to render the readings inaccurate. Typically, the installed mechanical type meters use a plurality of wheels such as is described in U.S. Pat. No. 3,806,904, which register units of a utility consumed in tens, hundreds, thousands, of units of the quantity used. Each wheel is divided into equal sections of ten units and the wheels are coupled where ten rotations of the tens wheels will cause one rotation of the hundreds wheel, etc. A segment scale or ladder is connected to each wheel to provide an electrical signal indicative of the position of its wheel and this readily converts to the quantity of die utility consumed. A receptacle is used to house a circuit board or wiring matrix that is accessible by reader device which records information stored in the receptacle as indicative of the position of its wheel and this readily converts to the quantity of the utility consumed.

Other prior art efforts are disclosed in U.S. Pat. Nos. 3,840,866 and 4,652,877.

SUMMARY OF THE INVENTION

The present invention avoids the drawbacks of the prior art by providing, in one form, a single chip micro-controller encoder that minimizes or eliminates the requirement common to the prior art of attaching cumbersome devices to the mechanical rotating disk type meter devices. Digit wheel sensing circuitry is provided that can be remotely activated to read the positions of the digit wheels of the mechanical meter so that the micro-controller can interpret the detected signals and communicate with a, meter reading device. Preferably, the micro-controller does not include a power source thus simplifying installation and maintenance. Further, the sensing is effected by inserting conductive members adjacent and attached to each digit wheel and cooperating stator discs sandwiched between each digit wheel pair. With this arrangement, alignment between a digit on the digit wheel and an associated conductive segment and a corresponding segment on the adjacent stator wheel will form a parallel plate capacitors. The second set of plates is at the center of the wheels and provides a return signal.

A meter reader is employed to activate the system and provide low level power to the system. The micro-controller directs an alternating current signal of 455 KHz sequentially to each of the ten stator board segments starting with the zero segment and ending with the "nine" segment. Preferably, all the segments on the digit wheel segments are connected electrically together and driven with the 455 KHz signal simultaneously. Capacitive coupling between an aligned stator segment and a digit wheel segments will result in a transmitted signal pulse for each pair of stator and digit wheels through the wheel slip-ring segment to the stator slip-ring segment to create a coupling such as a slip ring capacitor to the micro-controller. The difference in amplitude or other characteristic of the transmitted signal will signify to the micro-controller alignment with the known stator position and thus an accurate measure of position and thereby consumption of the utility.

DETAILED DESCRIPTION

Figure 1:
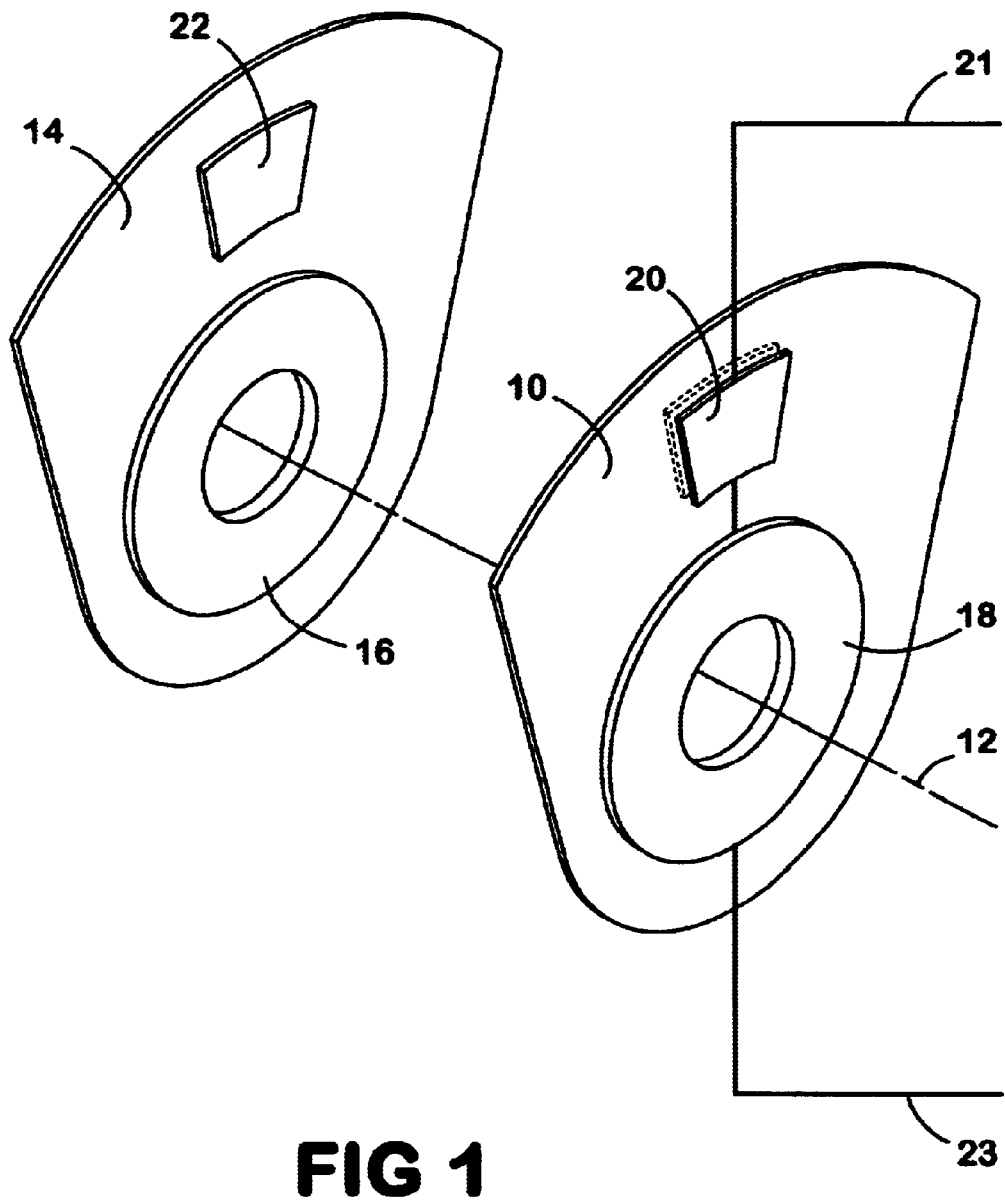
FIG. 1 is schematic, perspective view of a digit wheel and stator segment on a rotor with a slip ring capacitor.

Referring to the drawings, in FIG. 1, there is shown a schematic illustration of segments of a stator wheel 10 and a digit wheel 14. The digit wheels 14 are mounted for rotation with the drive shaft while the stator wheels 10 are stationary relative to the shaft 12. It will be understood that the meter is of standard construction having a plurality of digit wheels 14 which are mechanically operated and coupled to move in specified increments as is conventional. The first one of the digit wheels will move a single unit for each unit of the utility consumed such as water or electricity while an adjacent digit wheel will move after 10 units of the first wheel and the third wheel will move in sequence after 10 movements of the second wheel and a fourth wheel will move after 10 movements of the third wheel. A fifth and sixth wheel may be provided depending on usage.

As is conventional in utility meters, each digit wheel 14 is typically divided into unit segments wits the segments of the wheels representing either ones, tens, hundreds or thousands of units. The wheels are sequentially coupled to measure utility consumption. According to the present invention, each digit wheel 14 will be associated with a single stator wheel 10 although a single stator wheel may be configured to service two digit wheels by sandwiching a stator wheel between two digit wheels. Each wheel is divided into segments one of which shown in FIG. 1 and each segment at its outer radial periphery is provided with a conductive area 20 for the stators and 22 for the digit wheels 14. Each of these areas 20 and 22 are connected through a conductive line such as the one shown at 21 to the motherboard shown in FIG. 2. Since the stator wheel remains stationary, the signal is returned from the digit wheel slip-ring segment 16 to the stator wheel slip-ring segment 18 by capacitive coupling to transfer the signal data to line 23 to the motherboard as explained below.

Figure 2A:
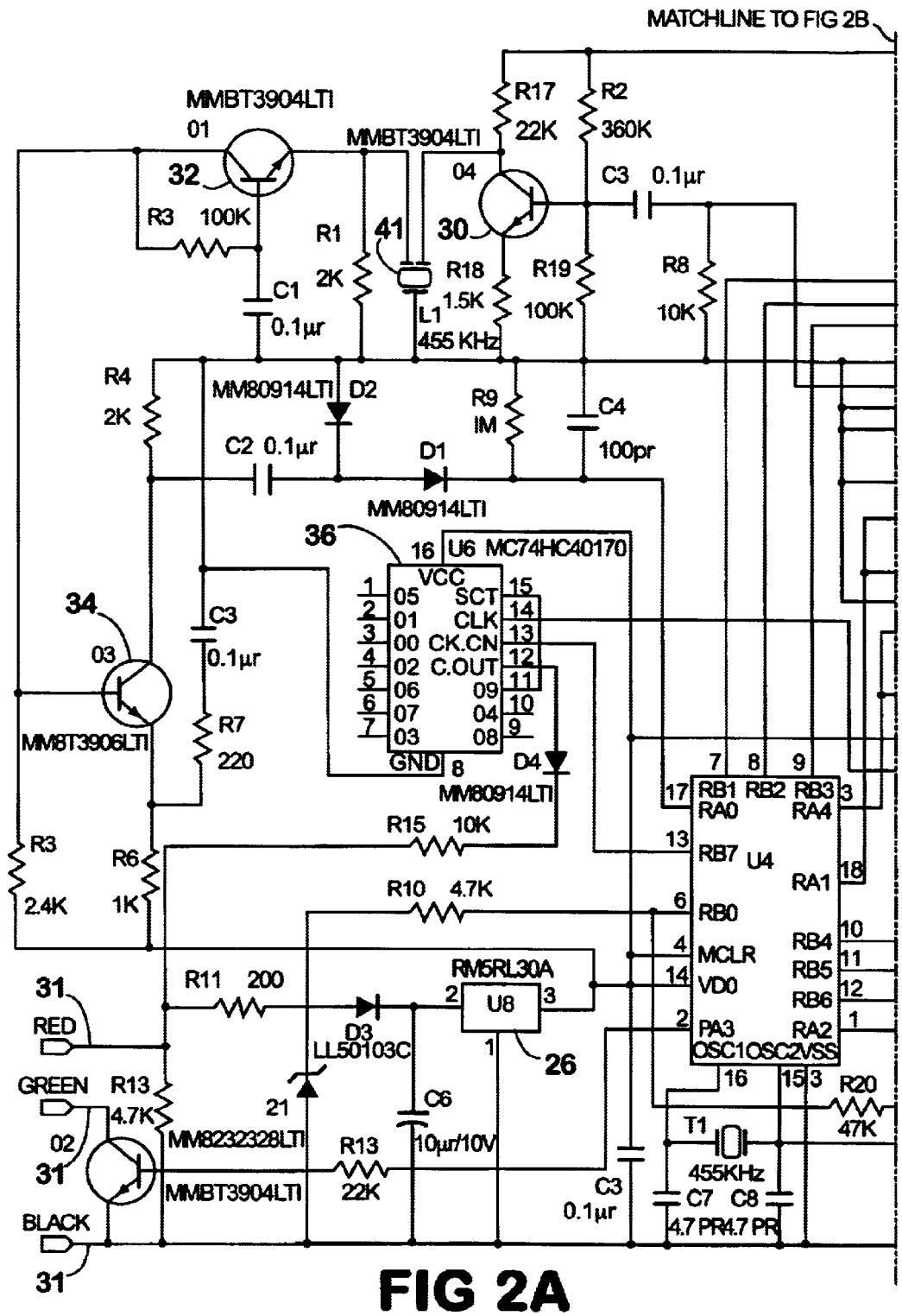
FIGS. 2A and 2B are a circuit layout for the motherboard of the micro-controller.
Figure 2B:
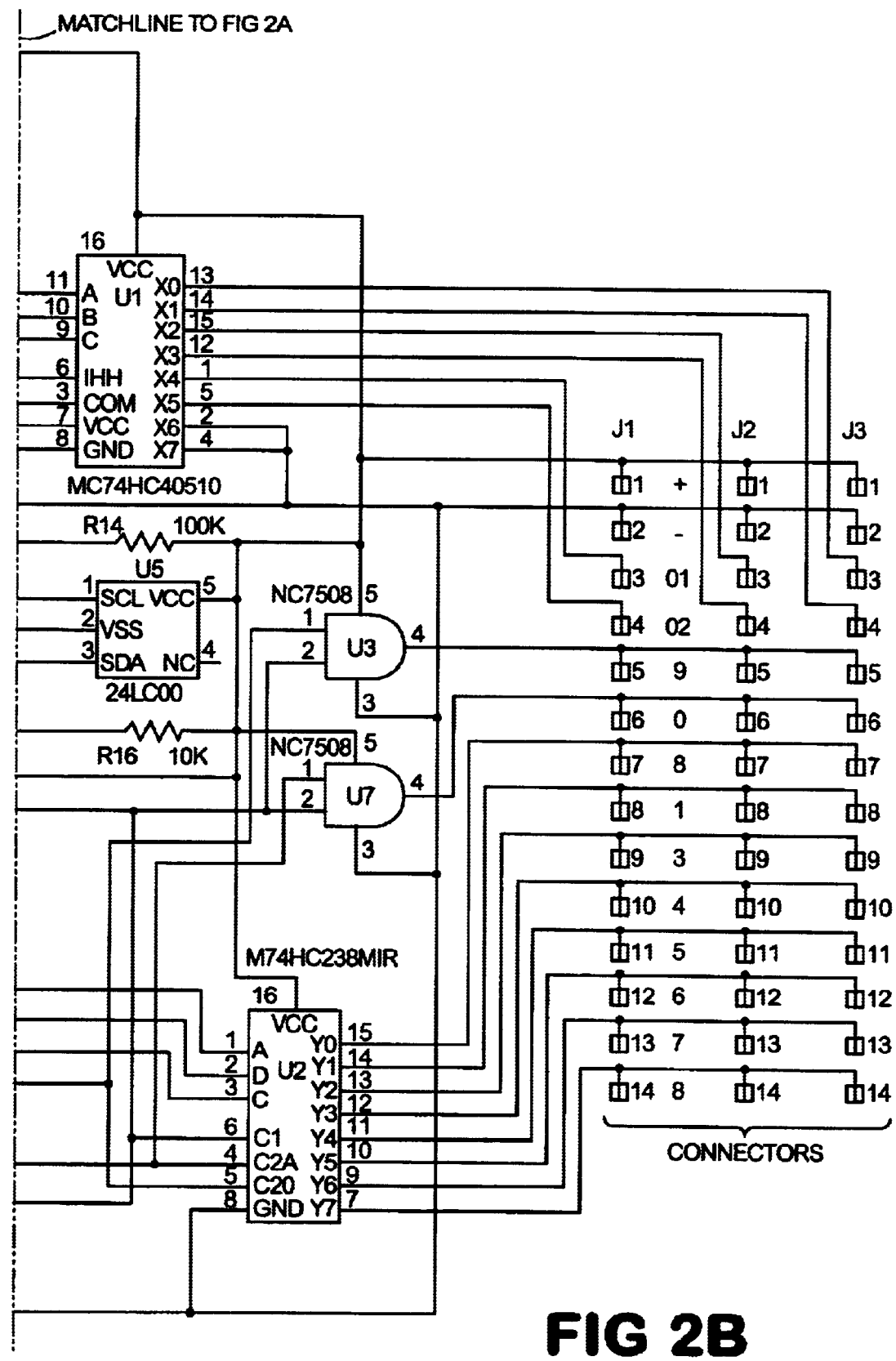

With reference to FIGS. 2A and 2B, there is schematically illustrated a circuit layout for the micro-controller 26 and the connection of a plurality of conductive areas 20 and 22. When a meter reading is required, the micro-controller 26 directs the application of the 455 KHz alternating current signal sequentially to each of the stator board conductive areas 20 starting with the zero unit area and ending with the 9 area. The transmitted signal will couple to a conductive area 22 on the digit wheel that is at that moment aligned with the particular conductive area 20 being driven. This signal will return to the micro-controller board 26 through the slip-ring capacitor 16, 18 and the line 23 associated with the particular stator wheel 10. The received signal will be amplified by amplifier 30 and the signal then passed through a band-pass filter 41 to be further amplified by amplifiers 32 and 34. The analog signal may then be converted to a digital signal at comparator 36 before being passed to a multiplexor unit as described below.

Micro-controller 26 is powered to maintain an internal operating voltage of 3.0 volts by a suitable regulator integrated circuit such as is provided at 36 as is commercially available.

Typically, the first function of the micro-controller 26 is to identify the reader device as a three wire or two wire device as these are the most commonly used reading devices on the market. Each of these readers provides distinctive the signatures in terms of activating frequencies and the micro-controller 26 can be set to identify and distinguish between these two as well as other reader activation frequencies such as, by way of example, connecting other reading devices defined by reception of a unique sequence of the 3 Kz signal burst of 40 ms duration followed by a steady DC level signal. Such a reader will be connected at the terminals 31 in FIG. 2A in a conventional manner. The signal provided by the external reader is routed to a series of multiplexor circuits through conventional resistances, rectifiers and filters as shown.

The next function of the micro-controller 26 is to determine the position of the digit wheels 14. With the microcontroller unit clocked at 455 KHz signal with a 3.0 volt amplitude, the energy is available to bridge the two parallel-plate capacitor as defined by the conductive areas 20 and 22 for each digit wheel 14 and stator wheel 10 as described above. As noted above, micro-controller 26 directly signals sequentially each of the areas of the stator wheels segments. Typically there will be at least three stator boards or wheels 10 but as many as six may be employed for a multiple number of the digit wheels 14. This is done through digital multiplexor circuits such as provided at 40, 42 in the microcontroller 26. During transmission of the 455 KHz signal, the micro-controller will sequence, multiplexer 40 to obtain a received signal amplitude value for each digit wheel in the encoder.

The received signal from each digit wheels slip ring 16 is very weak and has a high source impedance. A FET buffer amplifier may be provided for each digit wheel and will be located on the stator wheel or board preferably close to the stator digit wheel signal receiving slip ring segments.

Figure 4:
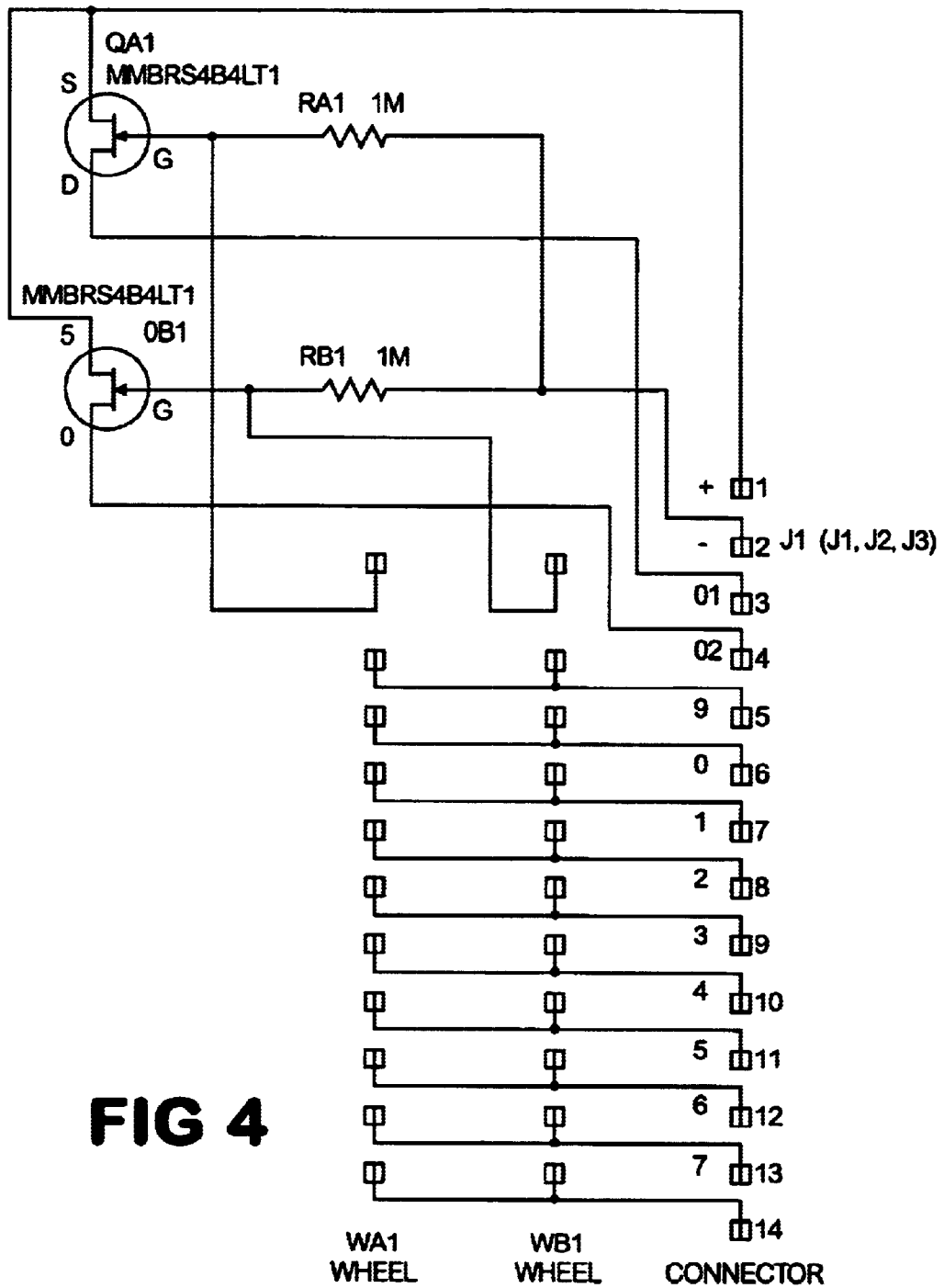
FIG. 4 is the circuit layout for a stator segment and wheel segment
Figure 5:
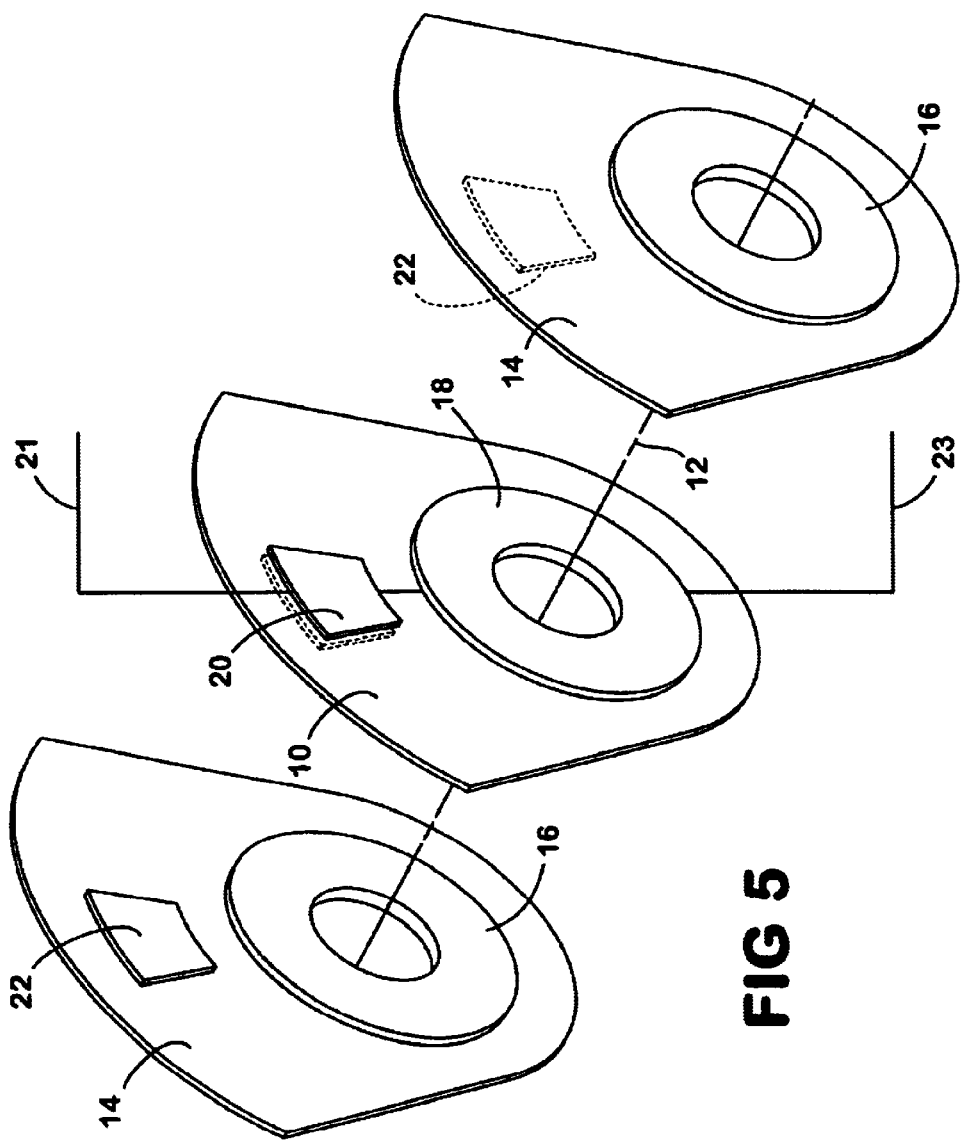
FIG. 5 is a schematic, perspective view of two digit wheels and a stator segment on a rotor with a slip ring capacitor.

FIG. 4 illustrates the typical circuit for these stator boards or wheels. It will be understood that a six digit wheel encoder will require three stator boards with one being sandwiched between two digit wheels while a four digit wheel encoder requires only two stator boards.

The received signal amplitude is inversely proportional to the size of the gap between the fixed stator conductive areas and the digit wheels conductive areas. In order to possess acceptable position sensing reliability, an air gap should be on the order of 5 mil thick and plastic gap less than 10 mil.

The micro-controller contains the encoding software that determines wheel position based on signal strength and uses an appropriate algorithm to avoid digit wheel rollover errors.

Connection of the micro controller to a two line reader device should be apparent from the foregoing.

Figure 3:
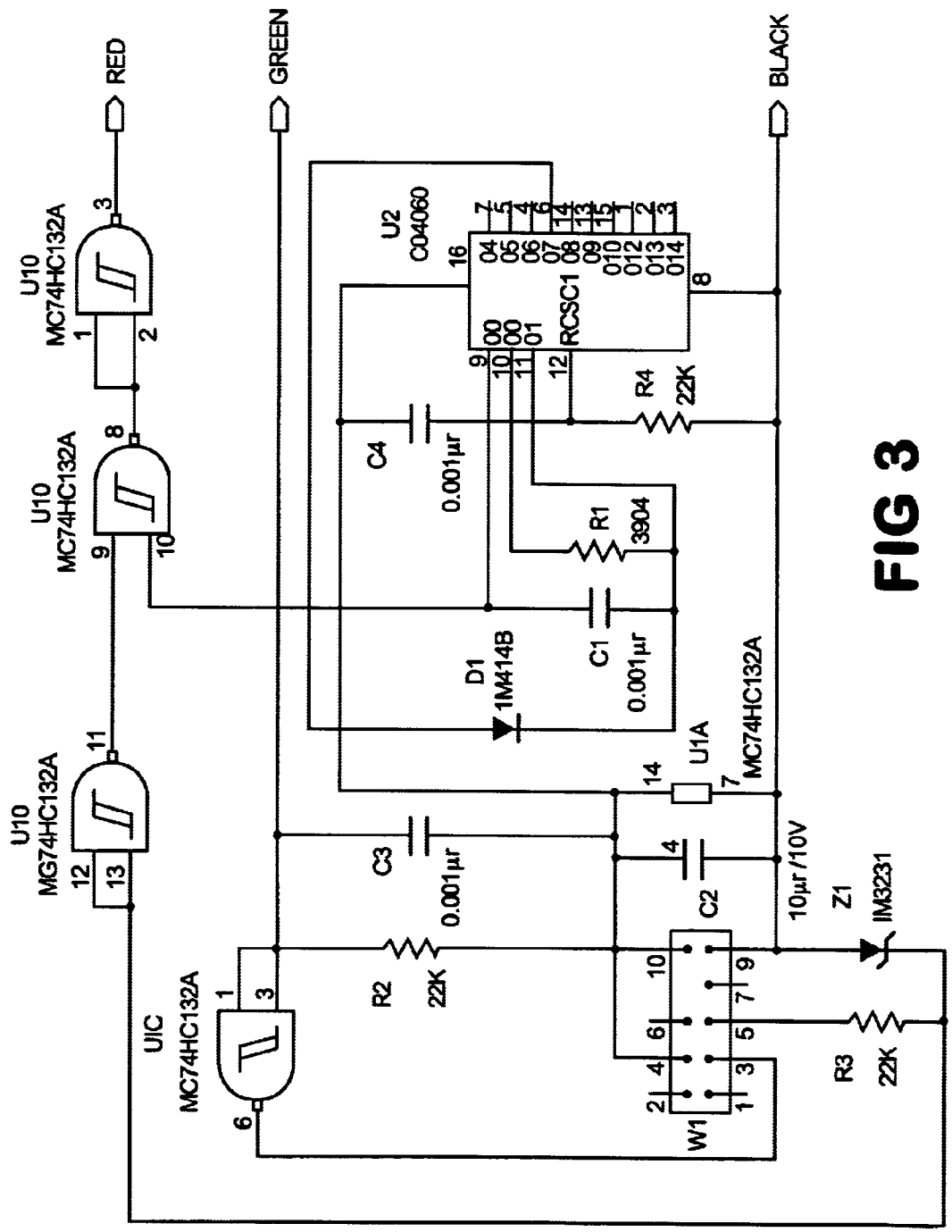
FIG. 3 is circuit layout for the reader.

A standard ASCII terminal may be employed to communicate with the encoder of FIG. 3. The user may read a program into the encoder to accommodate variations in utility meters to be read in terms of the identification numbers and the signal amplitudes employed for reading the digit wheel positions.

What is claimed is:

1. A utility data gathering system for measuring the consumption of a provided utility comprising:

at least one stator wheel comprising a plurality of conductive elements, wherein said stator wheel is centered about an axis;

a digit wheel comprising at least one conductive element, wherein said digit wheel is rotatable about said axis;

a microprocessor operable for applying a current sequentially to each of said conductive elements of the stator wheel;

reading an output capacitance signal value along a region around the axis of the stator wheel wherein the signal is generated when at least one of said conductive elements of the digit wheel is proximate to at least one of said conductive elements of the stator wheel, said output capacitance signal having a value proportional to the distance of said conductive elements of the digit wheel; and comparing each of the output capacitance values to determine the position of said digit wheel wherein the position of said digit wheel relative to said stator wheel is a specific quantity related to said consumption of the provided utility.

2. The invention as claimed in claim, 1 wherein each said stator wheel includes at least ten conductive members.

3. The invention as claimed in claim 1 wherein said discs ad said stator wheels are not in contact with each other.

4. The invention as claimed in claim 1 wherein said circuit includes a controller for directing a signal sequentially to each conductive member of said stator wheel in sequence and for determining said relative capacitance relation.

5. The invention as claimed in claim 1 wherein said circuit delivers a signal of at least 455 K to each said conductive member of said stator wheels.

6. A utility data gathering system comprising:

a plurality of discs wherein rotation of said discs reflect a quantity of consumption of the provided utility in increments of measure, a plurality of stator wheels wherein each said disc is associated with a said stator wheel, wherein said stator wheels include a plurality of circumferentially spaced conductive members and said discs include a single conductive member, and a circuit that delivers a signal to every said conductive member of said stator wheels to establish a relative capacitance relation between every said conductive member of said stator wheel and said conducive member of said associated discs wherein said relative capacitance relation determines said position of said discs and to determine said quantity of consumption of the provided utility in increments of measurement, wherein said disc and said stator wheel include a slip ring segment, wherein said signal is returned to said circuit by capacitance coupling between said slip ring of said stator wheel and said slop ring of said associated disc.

7. The invention as claimed in claim 6 wherein each said stator wheel includes at least ten conductive members.

8. The invention as claimed in claim 6, wherein said signal is at least 455 MHz to said stator wheels.

9. The invention as claimed in claim 6, wherein said discs and said stator wheels are not in contact with each other.

10. A utility data gathering system comprising:

a plurality of discs wherein rotation of said discs reflect a quantity of consumption of the provided utility in increments of measure, a plurality of stator wheels wherein each said disc is associated with a said stator wheel, wherein said stator wheels include a plurality of circumferentially spaced conductive members and said discs include a single conductive member, and a circuit that delivers a signal to said stator wheels to determine said quantity of consumption of the provided utility in increments of measurement, wherein at least two discs are provided with a stator wheel intermediate said two discs so that at least one said stator wheel is associated with two said discs.

11. The invention as claimed in claim 10 wherein each said stator wheel includes at least ten conductive members.

12. The invention as claimed in claim 10, wherein said signal is at least 455 KHz to said stator wheels.

13. The invention as claimed in claim 10, wherein said discs and said stator wheels are not in contact with each other.

* * * * *